(12) United States Patent
Hawthorn et al.

(10) Patent No.: US 8,462,013 B2
(45) Date of Patent: Jun. 11, 2013

(54) APPARATUS, SYSTEM, AND METHOD FOR COMMUNICATING WHILE LOGGING WITH WIRED DRILL PIPE

(75) Inventors: Andrew Hawthorn, Missouri City, TX (US); Goke Akinniranye, Sugar Land, TX (US); Benjamin Jeffryes, Cambridge (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 274 days.

(21) Appl. No.: 12/820,718

(22) Filed: Jun. 22, 2010

(65) Prior Publication Data

US 2010/0328095 A1 Dec. 30, 2010

Related U.S. Application Data

(60) Provisional application No. 61/221,843, filed on Jun. 30, 2009.

(51) Int. Cl.
*G01V 3/00* (2006.01)

(52) U.S. Cl.
USPC ............................ 340/854.3; 175/40; 175/320

(58) Field of Classification Search
USPC ................. 340/854.3; 175/40, 320; 166/68.1, 166/68.5, 77.51, 77.52, 77.53, 78.1, 85.1, 166/380
See application file for complete search history.

(56) References Cited

U.S. PATENT DOCUMENTS

| | | | |
|---|---|---|---|
| 3,795,141 A | 3/1974 | Planche | |
| 4,226,116 A | 10/1980 | Denison | |
| 5,433,276 A | 7/1995 | Martain et al. | |
| 6,092,416 A | 7/2000 | Halford et al. | |
| 6,174,001 B1 | 1/2001 | Enderle | |
| 6,641,434 B2 | 11/2003 | Boyle et al. | |
| 7,140,443 B2 * | 11/2006 | Beierbach et al. | 166/380 |
| 7,198,118 B2 * | 4/2007 | Hall et al. | 175/40 |
| 7,413,021 B2 | 8/2008 | Madhavan et al. | |
| 2005/0257933 A1 * | 11/2005 | Pietras | 166/380 |

* cited by examiner

*Primary Examiner* — Joseph Chang
*Assistant Examiner* — Jeffrey Shin
(74) *Attorney, Agent, or Firm* — Kimberly Ballew (57) ABSTRACT

Aspects of the inventions generally provide a method and apparatus for coupling a communication sub to a wired drill pipe. In one aspect, a surface of a coupler head is non threaded and configured to provide a retaining force. In another aspect, a coupler head is coupled to a body, and a support mechanism is coupled to the body and configured to secure the coupler head within a receiving end of the wired drill pipe. In another aspect, a method of placing a communication sub involves inserting the communication sub into the receiving end of the wired drill pipe, adjusting the position of the communication sub until an indication of signal communication between the communication sub and the wired drill pipe is observed, and after the indication of signal communication is observed, retaining the communication sub within the receiving end until removal of the communication sub is desired.

20 Claims, 8 Drawing Sheets

APPARATUS, SYSTEM, AND METHOD FOR COMMUNICATING WHILE LOGGING WITH WIRED DRILL PIPE

CROSS-REFERENCE TO RELATED APPLICATION

This application claims benefit of U.S. Provisional Patent Application Ser. No. 61/221,843, entitled "Apparatus, System and Method for Communicating While Logging With Wired Drill Pipe," filed Jun. 30, 2009, which is herein incorporated by reference.

BACKGROUND OF INVENTION

Well logging instruments are devices configured to move through a wellbore drilled through subsurface rock formations. The devices include one or more tools and other devices that measure various properties of the subsurface formations and/or perform certain mechanical acts on the formations. Such acts include drilling or percussively obtaining samples of the rock formations, and withdrawing samples of connate fluid from the rock formations. Measurements of the properties of the rock formations may be recorded with respect to the instrument axial position (depth) within the wellbore as the instrument is moved along the wellbore. Such recording is referred to as "well logging."

Well logging instruments can be conveyed along the wellbore by extending and withdrawing an armored electrical cable ("wireline"), to which the instruments are coupled at the end thereof. Extending and withdrawing the wireline may be performed using a winch or similar spooling device. However, such conveyance relies on gravity to move the instruments into the wellbore, which can only be used on substantially vertical wellbores. Wellbores deviating from vertical require additional force to move the well logging instruments through the wellbore.

One conveyance technique for conveying wireline instruments into a non-vertical wellbore includes coupling the wireline instruments to the end of coiled tubing having a wireline disposed therein. The wireline instruments are extended into and withdrawn from the wellbore by extending and retracting the coiled tubing, respectively. However, the use of coiled tubing with wireline instruments is costly and is inherently limited by the amount of pushing force the coiled tubing is capable of providing to assist the movement of the wireline instruments through the wellbore. As a result, the use of coiled tubing is typically problematic in extended reach wells.

Another well logging instrument conveyance technique includes coupling wireline configurable well logging instruments to the end of a drill pipe or similar threadably coupled pipe string. As the pipe string is extended into the wellbore, the wireline is extended by operating a conventional winch while the pipe string is being conveyed into the wellbore. However, this conveyance technique is frequently unreliable as the wireline is positioned in the annulus and subject to crushing, splicing, or other damage. For example, the wireline may become pinched between the drill pipe and the casing or wellbore. Another drawback to using drill pipe to convey the well logging instruments is that the cable disposed outside the pipe disturbs the operation of the sealing equipment and makes it difficult to seal the drill pipe to maintain fluid pressure.

Additionally, the well logging instruments may be positioned at the end of a drill pipe without the use of a wireline cable. In such circumstances, each well logging instrument is provided with a battery and memory to store the acquired data. As a result, the well logging instruments cannot communicate with the surface while downhole. Therefore, the data acquired, that may be critical to efficiently drilling the wellbore, cannot be analyzed at the surface until the wireline instruments return to the surface. Without any communication with the surface, surface operators cannot be certain the instruments are operating correctly and cannot modify the operation of the instruments in view of the data acquired.

Recently, a type of drill pipe has been developed that includes a signal communication channel within the structure of the pipe, which serves to protect the communication channel and assist in the movement thereof. Such drill pipe, known as wired drill pipe ("WDP"), has a signal coupler at each end thereof that is coupled to the signal communication channel within. When the signal coupler of one wired drill pipe is placed in proximity or in contact with the signal coupler of another wired drill pipe, for example when the two pipe ends are coupled together, signals may be transmitted between the signal couplers. These connections provide a contiguous signal communication channel from one end of a series of wired drill pipes to the other. The use of wired drill pipes has provided increased signal telemetry speed for use with "logging while drilling" ("LWD") instruments over conventional LWD signal telemetry, which typically is performed by mud pressure modulation or by very low frequency electromagnetic signal transmission.

At the surface, while drilling, a surface receiver sub is usually connected to the wired drill pipe (or wired drill string) to receive data from downhole and relay that data to a surface computer system, either by a hard wired connection or wirelessly. When one stand of pipe is drilled, a new stand needs to be connected. To connect a new stand, the surface receiver sub needs to be disconnected from the drill string. With current receiver subs and methods, disconnecting the receiver sub may take several minutes to complete. The same is true when reconnecting the receiver sub onto the newly attached pipe stand. As a result the communications between downhole tools and the surface system is disconnected, usually for at least few minutes, until the new stand is connected to the wired drill string and to the surface receiver sub. During this time, information packets that may have been traveling through the pipe and to the surface receiver sub may be lost.

This process happens in reverse when tripping out of the wellbore. While tripping out, the surface receiver sub is not present and the drill string is lifted out of the wellbore by the elevators and lifting bales. As each stand of drill pipe is tripped out of the wellbore, the rest of the wired drill string is secured on the rig floor by slips while the stand is disconnected from the wired drill string and secured on the rack. The elevators and the lifting bales are then lowered to pickup the next stand. During tripping in the wellbore, there is typically no communication between the downhole tools or other components of the WDP network and the surface system. There must be a receiver communicatively connected to the drill string, near or at the surface, in order to transmit data to the surface system.

As described above, during drilling, the transmission of data is done using a receiver sub that sits below the top-drive which can send the data onwards to the surface system. Since the surface receiver sub is generally threaded to the wired drill string in a top-drive, it is a slow process. The time required to thread in the receiver sub during drilling is acceptable since it takes a significantly longer time to drill a stand as compared to the time to reconnect the receiver sub after communication is disconnected. However, during logging while tripping with "wireline logging" ("WL") tools using WDP, the tripping time is much faster than the drilling time. Current devices and methods do not afford time to reconnect the receiver sub while tripping the WDP. It is beneficial to have the receiver sub attached to the drill WDP for the maximum amount of time so long as it does not interfere with the attachment of a new pipe stand. Therefore, to effectively use WL instruments with wired drill pipe, an apparatus, system and method for efficiently attaching and detaching a surface receiver sub is needed.

DETAILED DESCRIPTION

Generally, embodiments of the inventions relate to a system and method for communicating with a wellbore instrument or a "string" of such instruments in a wellbore using a wired pipe string for conveyance and signal communication. The wired pipe string may be assembled and disassembled in segments to effect conveyance through a wellbore. While embodiments of the present inventions are described as used with tools commonly conveyed on a wireline ("wireline tools"), embodiments may be implemented with any other type of downhole tools, such as LWD tools. The description provided below relates to embodiments of the inventions, and none of the embodiments are meant to limit the inventions. The inventions should be provided their broadest, reasonable meaning as defined by the claims.

Figure 1:
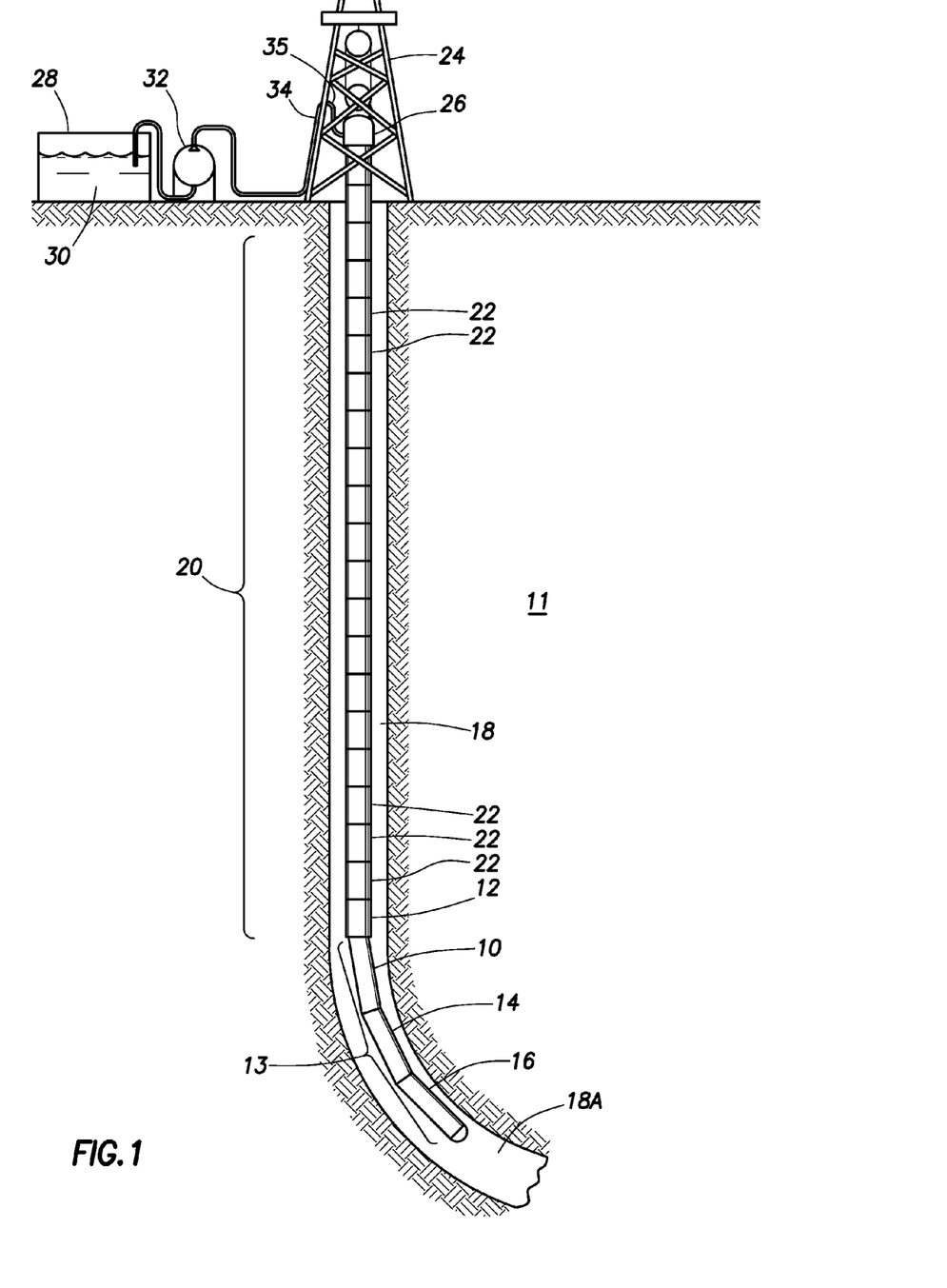
FIG. 1 illustrates a drill rig having a drill string on which embodiments of the present inventions may be used.

In FIG. 1, a drilling rig 24, or similar lifting device for conveying drill pipe, moves a wired pipe string 20 within a wellbore 18 that has been drilled through subsurface rock formations, shown generally at 11. The wired pipe string 20 may be extended into the wellbore 18 by threadedly coupling together the inserting end and the receiving end of a number of segments ("joints") 22 of wired drill pipe.

The wired pipe string 20 may include one, an assembly, or a "string" of wellbore instruments at a lower end thereof. In the present example, the wellbore instrument string may include well logging instruments 13 coupled to a lower end thereof. As used in the present description, the term "well logging instruments" or a string of such instruments means one or more wireline configurable well logging instruments that are capable of being conveyed through a wellbore using armored electrical cable ("wireline"), logging while drilling ("LWD") tools, measure while drilling ("MWD") tools, formation evaluation tools, formation sampling tools, and/or other tools capable of measuring a characteristic of the formation. Wireline configurable well logging instruments are distinguishable from LWD instruments, which are configurable to be used during drilling operations and form part of the pipe string itself. While generally referred to as the well logging instrument 13, the well logging instrument 13 may include one, an assembly, or a string of wireline configurable logging instruments.

Several of the components disposed proximate the drilling unit 24 may be used to operate components of the system. These components will be explained with respect to their uses in drilling the wellbore to better enable understanding of the inventions. The wired pipe string 20 may be used to turn and axially urge a drill bit into the bottom of the wellbore 18 to increase its length (depth). During drilling of the wellbore 18, a pump 32 lifts drilling fluid ("mud") 30 from a tank 28 or pit and discharges the mud 30 under pressure through a standpipe 34 and flexible conduit 35 or hose, through a top drive 26 and into an interior passage (not shown separately in FIG. 1) inside the pipe string 20. The mud 30 exits the drill string 20 through courses or nozzles (not shown separately) in the drill bit, where it then cools and lubricates the drill bit and lifts drill cuttings generated by the drill bit to the Earth's surface.

When the wellbore 18 has been drilled to a selected depth, the pipe string 20 may be withdrawn from the wellbore 18. An adapter sub 12 and the well logging instrument 13 may then be coupled to the end of the pipe string 20, if not previously installed. The pipe string 20 may then be reinserted into the wellbore 18 so that the well logging instrument 13 may be moved through, for example, an inclined portion 18A of the wellbore 18, which would be inaccessible using armored electrical cable ("wireline") to move the well logging instrument 13. The well logging instrument 13 may be positioned on the pipe string 20 in other manners, such as by pumping the well logging instrument 13 down the inner bore of the pipe string 20 or otherwise moving the well logging instrument 13 down the pipe string 20 while the pipe string 20 is within the wellbore 18.

During well logging operations, the pump 32 may be operated to provide fluid flow to operate one or more turbines (not shown in FIG. 1) in the well logging instrument 13 to provide power to operate certain devices in the well logging instrument 13. However, when tripping in or out of the wellbore 18, it is generally infeasible to provide fluid flow. As a result, power may be provided to the well logging instrument 13 in other ways. For example, batteries may be used. In one embodiment, the batteries may be rechargeable batteries that may be recharged by turbine(s) during fluid flow. The batteries may be positioned within the drill collar of the tool or in a separate drill collar. Other known manners of powering the well logging instrument 13 may be used as well.

As seen in FIGS. 2A-D, wired drill pipe is structurally similar to ordinary drill pipe. The wired pipe string 20 may comprise pipe joints communicatively coupled together such that data may be transmitted across each pipe joint. For example, wired drill pipe may include a cable, either partially or fully embedded within the structure of the pipe, associated with each pipe joint that serves as a signal communication channel and possibly for electrical power delivery. The cable may be any type of cable capable of transmitting data and/or signals, such as an electrically conductive wire, a coaxial cable, an optical fiber, or the like. Wired drill pipe typically includes some form of communication element connected to the signal communication channel to communicate signals between adjacent pipe joints when the pipe joints are coupled end to end as shown in FIG. 1. Examples of communication elements include inductive couplers, non-toroidal inductive couplers, flux couplers, direct connect couplers, or any component for transmitting data across tool joints. In an embodiment, the wired pipe string 20 may be similar to the wired pipe string described in U.S. Pat. No. 7,413,021, filed by Madhavan, et al., and assigned to the assignee of the present invention, or U.S. Pat. No. 6,641,434 issued to Boyle et al., and assigned to the assignee of the present invention.

Figure 2A:
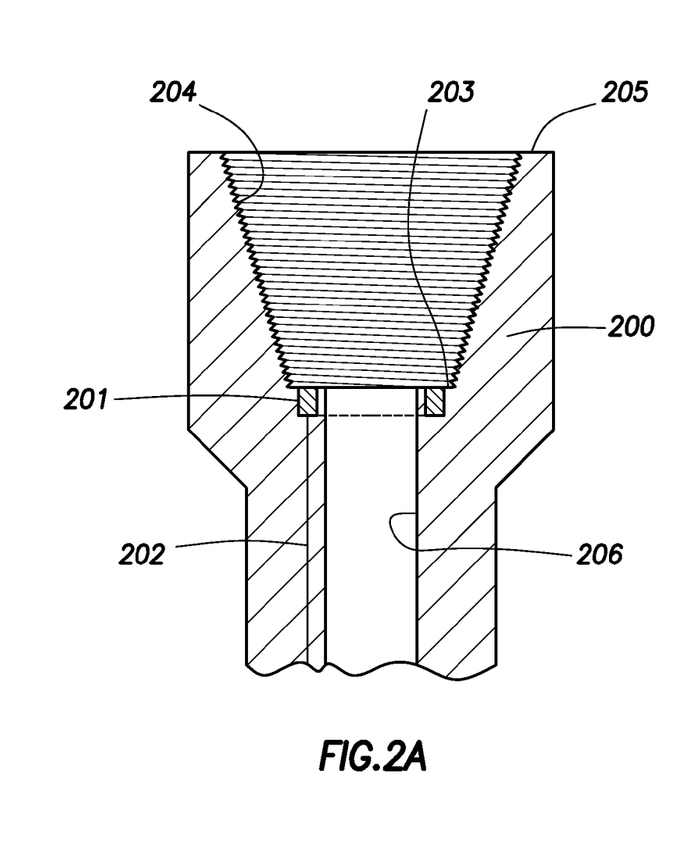
FIG. 2A Illustrates a cross-sectional view of one embodiment of a wired drill pipe.
Figure 2B:
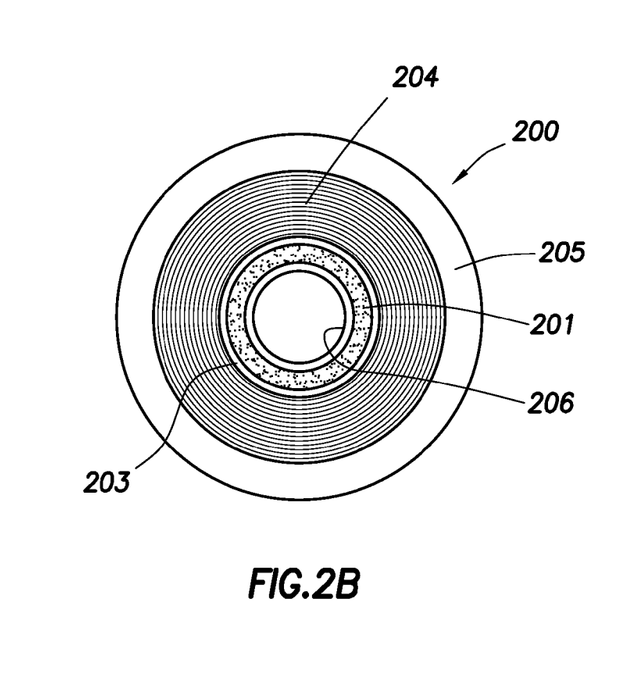
FIG. 2B illustrates a top view of the wired drill pipe of FIG. 2A.

The embodiment shown in FIG. 2A has the receiving end of a pipe (pipe end 200), in cross-section, having an inner shoulder 203, threaded section 204, outer shoulder 205, and a communication element 201 embedded within the inner shoulder 203. The threaded section 204 as shown may generally resemble the surface of a tapered cylinder, having threads disposed thereon, which extends from the surface of the inner shoulder 203 to the surface of the outer shoulder 205. The surfaces of the inner shoulder 203 and outer shoulder 205 may be generally parallel to one another and generally perpendicular to a central axis of the pipe end 200. The communication element 201 in this embodiment is a ring of electrically conductive material positioned around the inner bore 206 of the pipe end 200, as shown in FIG. 2B. The communication element 201 may have a portion exposed at a surface of the inner shoulder 203. Coupled to the communication element 201 is a signal communication channel 202 embedded within the pipe end 200. The communication element 201 may be made of an electrically conductive material, an inductive coil, fiber optic array, or any other element capable of communicating signals.

Figure 2C:
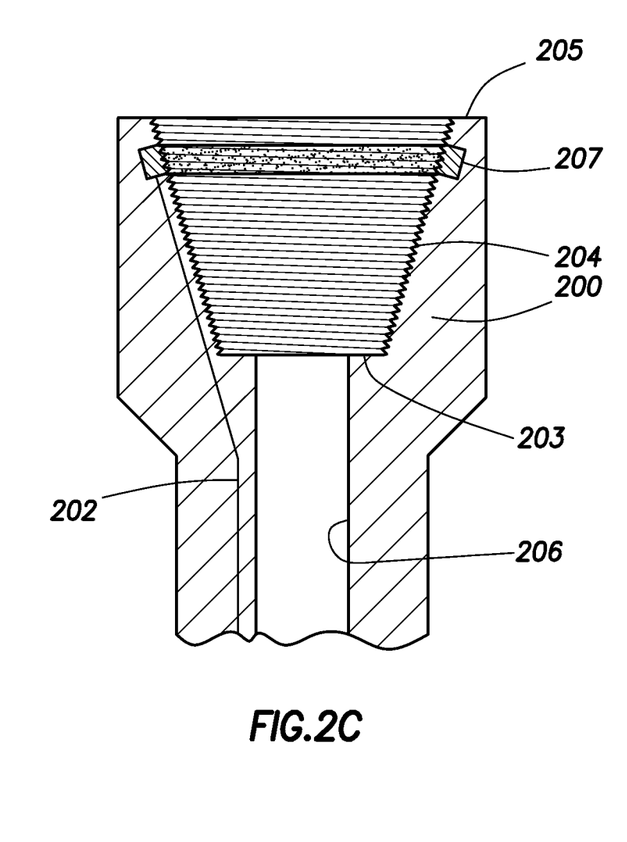
FIG. 2C illustrates a further embodiment, in cross-section, of a wired drill pipe.
Figure 2D:
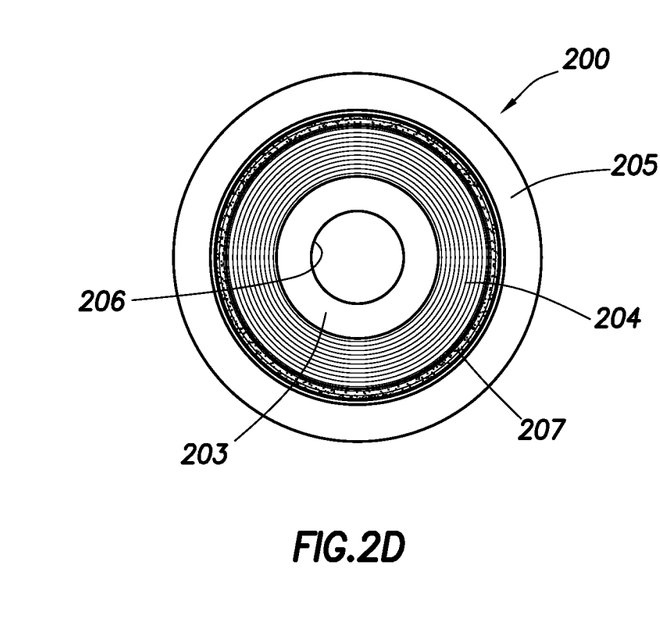
FIG. 2D illustrates a top view of the wired drill pipe of FIG. 2C.

In FIG. 2C, a communication element 207, which is similar in shape and function to the communication element 201 of FIGS. 2A and 2B, is embedded within the threaded section 204 of the pipe end 200 rather than in the inner shoulder 203. The communication element 207 may have a portion which may be exposed at a surface of the threaded section 204. The communication element 207 is also connected to a signal communication channel 202. FIG. 2D shows a top view of the pipe end 200 to further illustrate how the communication element 207 is positioned. FIGS. 2A-D are presented as examples of a wired drill pipe, and should not be considered limiting of the inventions. Embodiments of the present inventions can be used with other communication or telemetry systems, including a combination of telemetry systems, such as a combination of wired drill pipe, mud pulse telemetry, electronic pulse telemetry, acoustic telemetry, or the like.

Referring back to FIG. 1, signals detected by various devices, non-limiting examples of which may include an induction resistivity instrument 16, a gamma ray sensor 14, and a formation fluid sampling device 10 (which may include a fluid pressure sensor), of the well logging instrument 13 may be transmitted toward the Earth's surface along the wired pipe string 20. The signals transmitted by the well logging instrument 13 may be transmitted to a receiver sub (not shown in FIG. 1), embodiments of which are described below. The receiver sub may be configured to receive signals from the well logging instrument 13 and transmit them to a surface computer or component to be recorded and/or analyzed. Signals may be transmitted during tripping of the pipe string 20, while the pipe string 20 is stationary, during drilling operations, or during run-in operations.

Figure 3A:
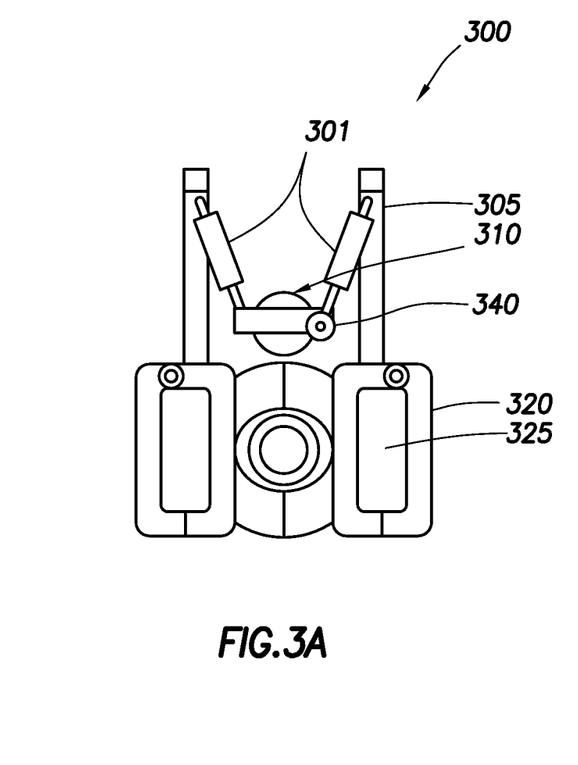
FIG. 3A illustrates a top view of a communication system for transmitting data to and/or from a drill string to a surface component according to one embodiment of the inventions described herein.
Figure 3B:
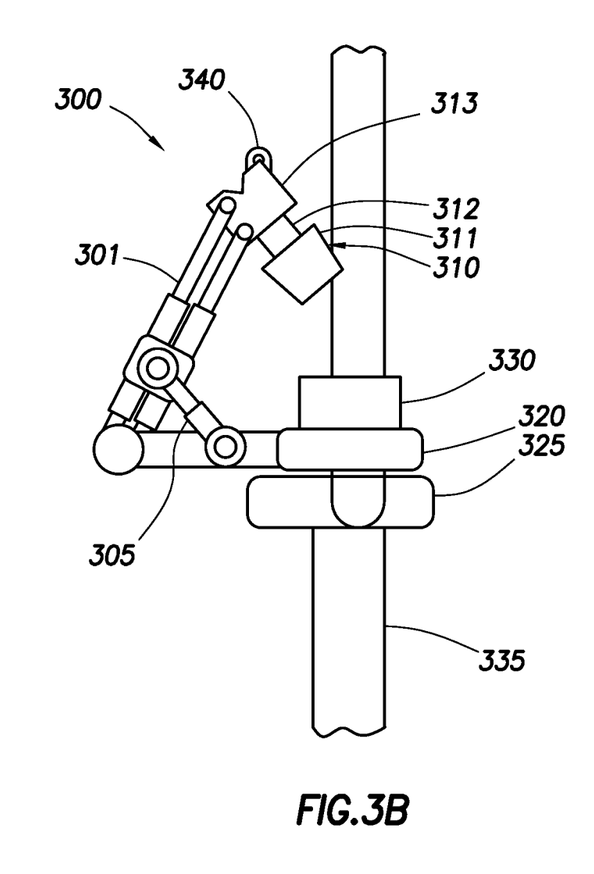
FIG. 3B illustrates a side view of the communication system of FIG. 3A.
Figure 3C:
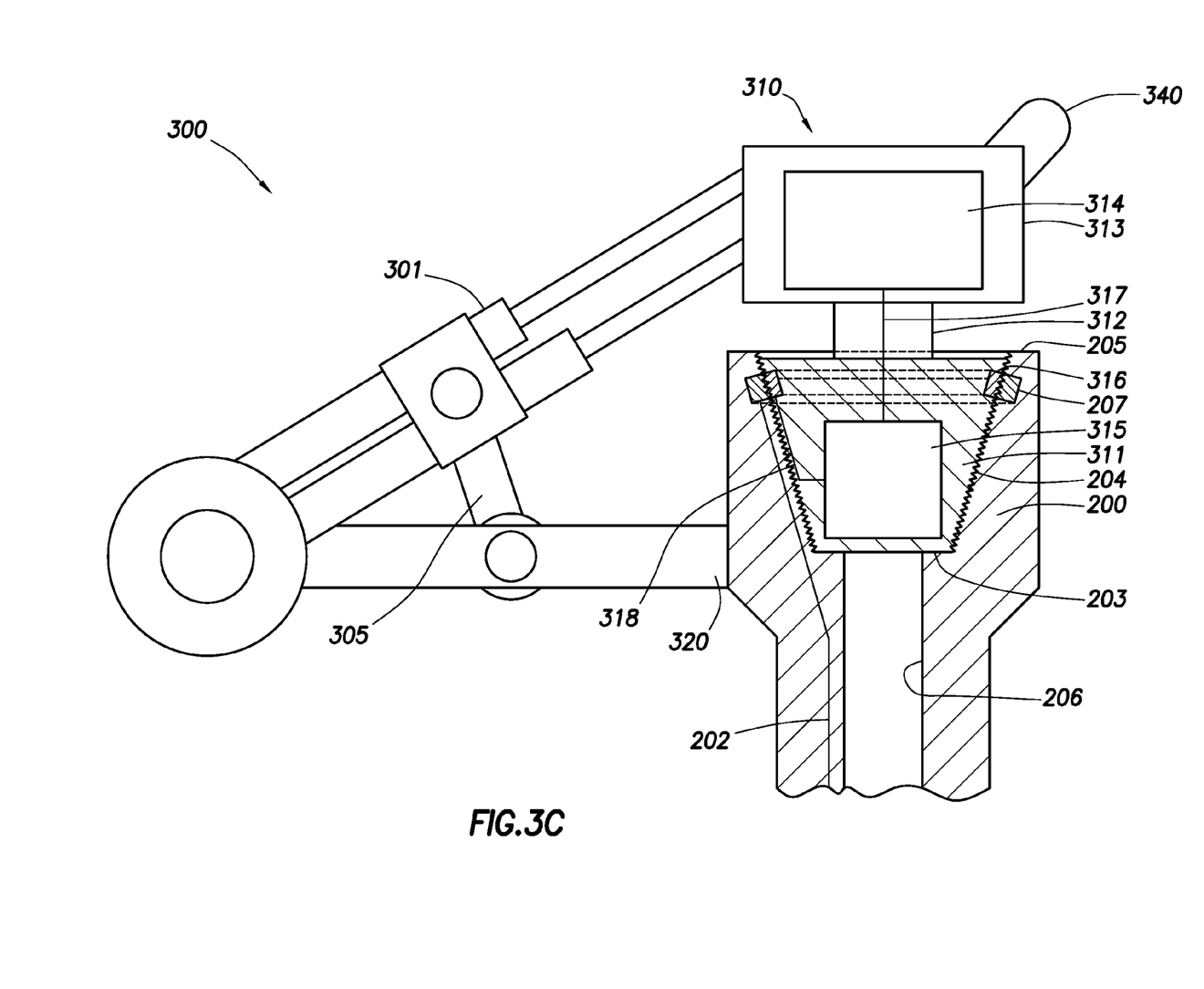
FIG. 3C illustrates a cross sectional view of the communication system of FIGS. 3A and 3B with the tripping sub positioned within the pipe end of FIG. 2C.

When tripping in and out of the wellbore 18 or performing another process where drill pipe is being added, removed, or disconnected from the wired pipe string 20, it may be beneficial to have an apparatus and system for communicating from the wired drill pipe string 20 to a surface computer or other component to receive, analyze, and/or transmit data. One embodiment of a wired drill pipe communication system 300 for connection to the wired drill pipe string 20 is shown in FIGS. 3A-C. The system 300 is depicted in FIGS. 3A and 3B from its top and side views, respectively.

FIGS. 3A and 3B show a communication sub, herein after tripping sub 310, that may be positioned in, secured to, and/or attached to a motion system as part of the communication system 300. The motion system may be for positioning and attaching the tripping sub 310 relative to the receiving end (end 330) of a pipe 335. In one embodiment, the motion system may include vertical adjustment arms 305 and lateral adjustment arms 301 which may be connected to and/or secured to top drive elevators and lifting bales 325. For example, a clamp 320 may be used to secure the adjustment arms 301, 305 to the elevators and lifting bales 325. The clamp 320 and adjustment arms 301, 305 may move with the top drive lifting bales 325. The tripping sub 310 may be attached to the vertical adjustment arms 305. The adjustment arms 301, 305 may be adjusted to move the tripping sub 310 vertically and/or laterally. The tripping sub 310 may be positioned by the adjustment arms 301, 305 into the end 330 of the pipe 335. The end 330 of the pipe 335 may be, for example, of similar construction to those shown in FIGS. 2A-D. The adjustment arms 301, 305 may be one of a cylinder, linear actuator, drive screw, or other such device configured to vertically and/or laterally position the tripping sub 310. The adjustment arms 301 and 305 may be adjusted manually or automatically. The adjustment arms 301, 305 may be hydraulic or electrically driven and may be controlled from a remote location or by an operator standing adjacent the communication system 300. The adjustment arms 301, 305 may be equipped with sensors to determine a position of the adjustment arms and/or the tripping sub 310 with respect to the end 330 of the pipe 335. The adjustment arms 301, 305 may also contain force and/or torque sensors to determine, change, and/or limit the amount of force used to position the tripping sub 310 into the end 330 of the pipe 335. The tripping sub 310 should be placed with an adequate amount of force so that communication elements (not shown in FIGS. 3A and 3B) embedded within the pipe sections 22 and tripping sub 310 are in close proximity or in contact to allow the communication of signals to one another.

In one embodiment, the adjustment arms 301, 305 may be provided with a communications module 340 comprising one or more of a camera, a wired communication port, a wireless antenna, a global positioning satellite/receiver, and components for transferring data, images, and information related to the position of the tripping sub 310 and/or the adjustment arms 301, 305. The force and/or the torque sensors for the adjustment arms 301, 305 may be incorporated into and/or positioned within the communications module 340. The communications module 340 may communicate bi-directionally with a processor, surface computer or component for transmitting controls related to the operation of the adjustment arms 301, 305.

The tripping sub 310 may have sensors for determining and/or measuring forces applied to it and/or its location. For example, the sensors may be torque or positional sensors to ensure proper alignment and securement of the tripping sub 310 in the pipe 335. The sensors may aid in aligning the tripping sub 310 with the pipe 335 without damaging the tripping sub 310 or the pipe 335. In one embodiment, insertion of the tripping sub 310 into the pipe 335 may automatically cease upon proper verified communication with the pipe 335. In an embodiment comprising an automated process, the tripping sub 310 may transmit a signal to the adjustment arms 301, 305 upon communication with the pipe 335.

The tripping sub 310 may comprise a coupler head 311, a neck 312, and a body 313. The coupler head 311, neck 312, and body 313 may be integrally formed or may be separate components communicatively coupled. In either embodiment, the coupler head 311 may comprise a communication element for communicating with the pipe 335 and sensors for position and/or force. The neck 312 may comprise sensors for position and force as well as a communication device for transmission of data to a surface computer, processor, or other component located locally or remotely with respect to the rig. It should be appreciated that this is merely one example of the construction of the tripping sub 310 and other configurations are possible.

FIG. 3C depicts the communication system 300 in cross-section with the tripping sub 310 positioned within the pipe end 200 of FIG. 2C. In one embodiment, the coupler head 311 may be substantially similar in shape to the threaded section 204 of the pipe end 200. For example, the coupler head 311 may be in the shape of a tapered cylinder with one end being of a similar diameter to the diameter of the inner shoulder 203 and having a taper angle matching that of the threaded section 204 of the pipe end 200. The coupler head 311 may extend from the inner shoulder 203 of the pipe end 200 and may terminate before the outer shoulder 205, at the outer shoulder 205, or beyond the outer shoulder 205. The coupler head 311 may have contours similar in shape to the threads of the threaded section 204 to allow for better placement and engagement with the pipe end 200 while not having to thread the tripping sub 310 into the pipe end 200. The shaping of the coupler head 311 as described above may increase the efficiency of placement of the tripping sub 310 into the pipe end 200. By having the coupler head 311 formed in a similar shape to the threaded section 204 axial alignment of the tripping sub 310 into the pipe end 200 may be more readily attained when the surfaces of the coupler head 311 and threaded section 204 are in contact along their entire perimeter. In one embodiment, the tapered surface of the coupler head 311 may force the tripping sub 310 closer toward the center of the pipe end 200 when contacted by the tapered surface of the threaded section 204.

The tripping sub 310 may further contain a battery 314, housed within the body 313, and a wireless transmitter 315, housed in the coupler head 311, which can transfer signals received from the well logging instrument 13 to a surface computer or processor or other component on the rig. Connecting the battery 314 and wireless transmitter 315 may be a wire 317 which may provide power from the battery 314 to the wireless transmitter 315. The battery 314 and wireless transmitter 315 may be housed in the body 313, neck 312, or coupler head 311 together or separately depending on the size and shape of the components used.

Embedded within the coupler head 311 may be a communication element 316 which may be used to communicate with the communication element 207 of the pipe end 200. The communication element 316 is positioned within the coupler head 311 in such a way that when the tripping sub 310 is properly positioned into the pipe end 200 the communication element 316 of the tripping sub 310 and the communication element 207 of the pipe end 200 are in close proximity or in contact with one another. The communication element 316 may be oversized, compared to the communication element 207, in a direction parallel to the tapered surface of the coupler head 311. Over sizing the communication element 316 may assist in establishing communicative contact with the communication element 207 if the tripping sub 310 is not fully inserted or properly aligned with the pipe end 200.

Connecting the communication element 316 to the wireless transmitter 315 may be a wire 318. The wireless transmitter 315 may be replaced with a wired connection, and the battery 314 may be replaced with a power chord or similar powering device. The neck 312 of the tripping sub 310 may be constructed in a way such that the body 313 is in contact with or proximate to the outer shoulder 205 of the pipe end 200 when the tripping sub 310 is properly positioned. An advantage of having the neck 312 be of a length such that the body does not contact the outer shoulder 205 allows for adequate pressure to be applied to the coupler head 311, before the body 313 contacts the outer shoulder 205, so as to assure proper placement of the coupler head 311 and communication element 316.

The adjustment arms 301, 305 may provide adequate vertical and/or lateral forces while the coupler head 311 is positioned within the pipe end 200 so the tripping sub 310 does not become removed from the pipe end 200, thereby breaking communications between the communication element 207 of the pipe end 200 and the communication element 316 of the tripping sub 310.

In another embodiment, the tripping sub 310 may be pressure or friction fit into the pipe 335. For example, the coupler head 311 may be adjustable from a first diameter to a second diameter, wherein the second diameter is substantially similar to the diameter of the threaded section 204 of the pipe end 200. The coupler head 311 may be constructed of a material that is deformable and has elasticity so that when inserted into the pipe end 200 the coupler head 311 may assume a shape and size similar to that of the threaded section 204. In another embodiment, the coupler head 311 may have a partially threaded exterior in order to provide an additional mode of engagement with the pipe end 200. In another embodiment, the tripping sub 310 may have a connection, such as for example a box end connection, which only requires a partial rotation of the tripping sub 310 to provide coupling engagement with the pipe end 200. In another embodiment, the tripping sub 310 may be held in the pipe end 200 by its own weight.

The tripping sub 310 may be made of a material softer than the pipe 335. For example, the tripping sub 310 may be made of a material, such as rubber, aluminum, brass, chrome, or other materials. The material for the tripping sub 310 may be selected to eliminate any damage to the threads of the pipe 335 due to any misalignment during connection. The material of the tripping sub 310 may also be one that is resistant to corrosion caused by the caustic materials used during drilling, such as drilling "mud", oil, or other chemicals.

In use, the well logging instrument 13 and/or other tools are connected and deployed in the well using the wired drill string 20. The well logging instrument 13 may log the wellbore 18 while tripping in and/or out of the wellbore 18. When the drill string 20 is tripped into a position in which the well logging instrument 13 is to begin logging the wellbore 18, the pipe 335 may be positioned in slips and held by the lifting bales 325 at the end 330 of the pipe 335. The tripping sub 310 may be positioned in the end 330 of the pipe 335 to provide communication between the pipe 335, the wired drill string 20 and a surface component, such as a surface processor or computer. Upon connection with the pipe 335, the surface system may send commands and receive data to and from the well logging instrument 13 and/or other downhole components. At the same time, the top drive elevator and lifting bales 325 can start tripping out of the wellbore 18. The system 300 can continue to collect data and send commands to and/or from the well logging instrument 13 until the pipe 335 is disconnected from the wired drill string 20. Then, the tripping sub 310 (or another tripping sub 310) may be positioned in a subsequent pipe and the process may be repeated.

Figure 4A:
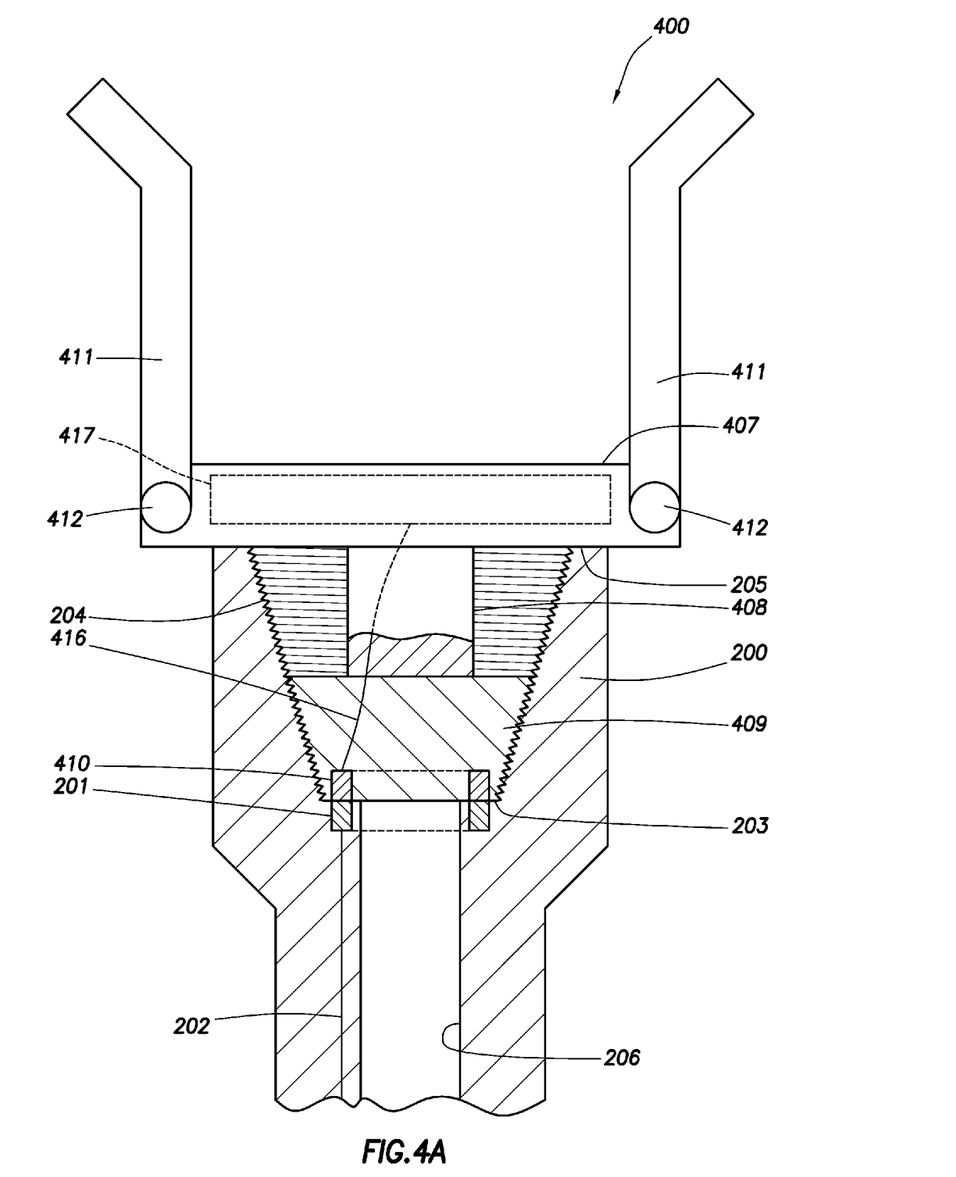
FIG. 4A illustrates a tripping sub being positioned in the pipe end of FIG. 2A according to one embodiment of the inventions described herein.
Figure 4B:
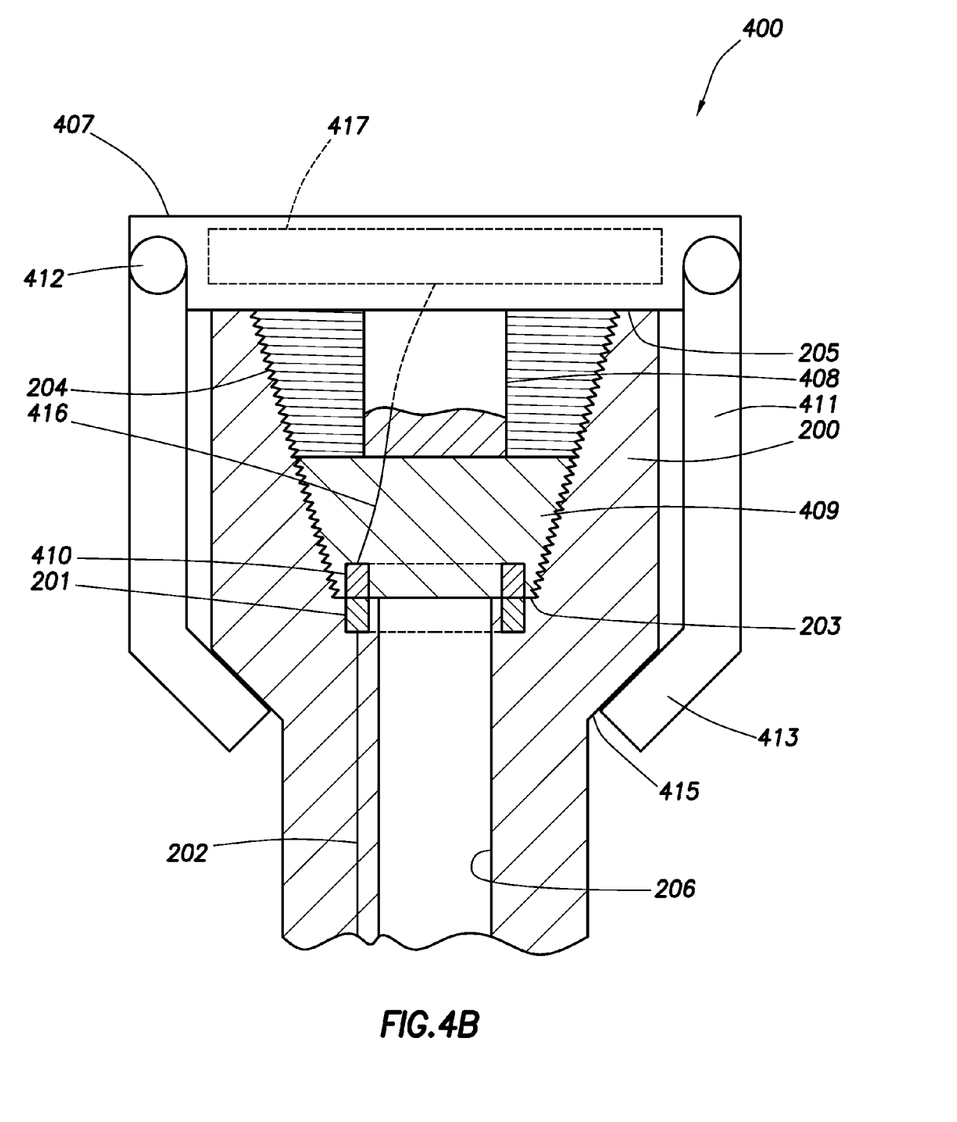
FIG. 4B illustrates one embodiment of a latching method for the tripping sub of FIG. 4A.
Figure 4C:
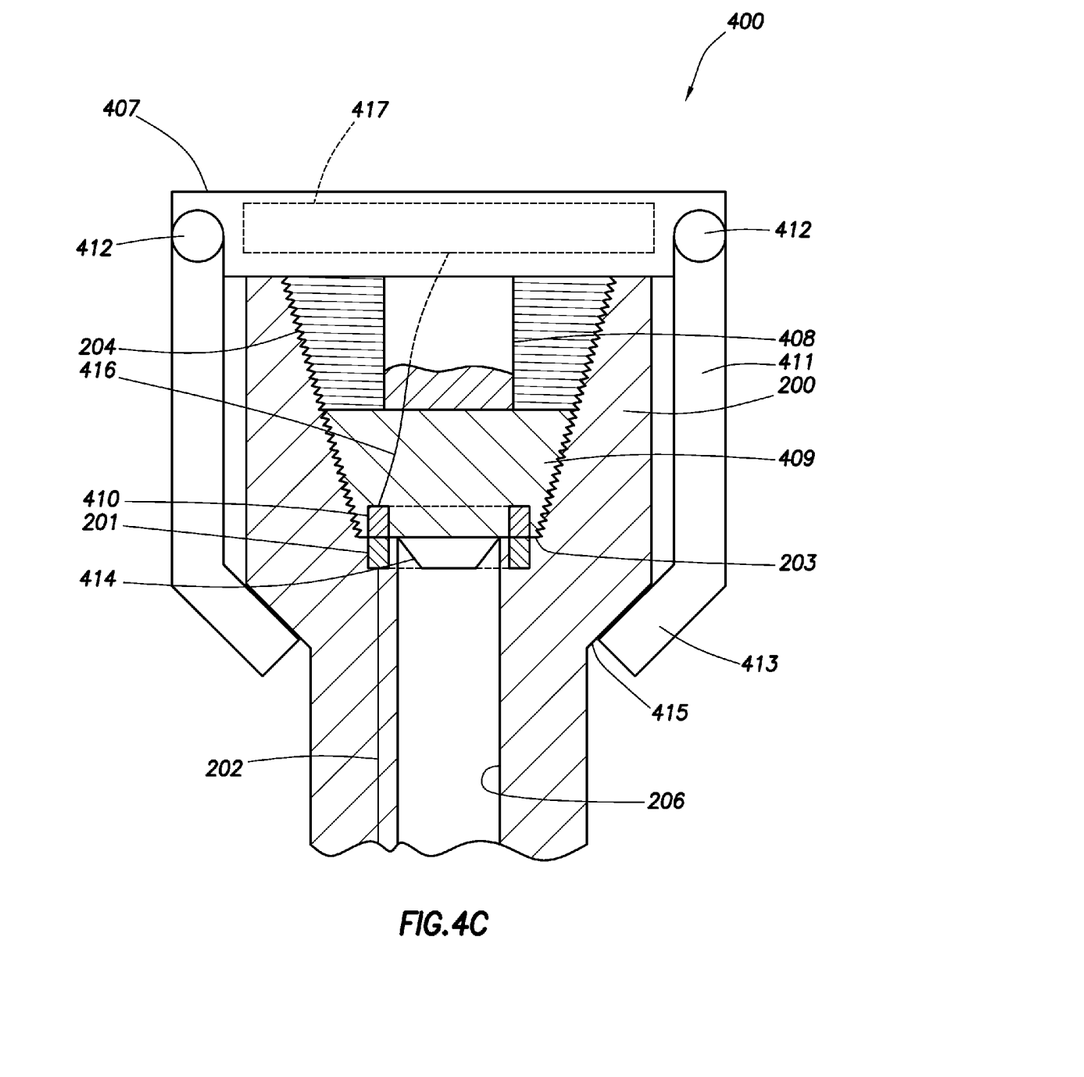
FIG. 4C illustrates the tripping sub of FIGS. 4A and 4B with an additional locating feature according to one embodiment of the inventions described herein.

Referring now to FIGS. 4A-C, embodiments of a tripping sub, in cross-section, and method for quick connection are shown. In FIG. 4A a tripping sub 400 is shown disposed in pipe end 200 in a pre-latched position. The tripping sub 400 generally includes a body 407, neck 408, coupler head 409, communication element 410, latching arms 411, and arm couplers 412. In the embodiment shown, the latching arms 411 are extended in an open position allowing easy placement or removal of the tripping sub 400 into or out of the pipe end 200. The arm couplers 412 may be any coupler that allows axial rotation of the latching arms 411. This can include, but is not limited to, bolts, screws, shafts, etc. The arm couplers 412 couple latching arms 411 to the body 407. The neck 408 is coupled to the body and may be formed of, for example, a hollow pipe, spring, or solid pipe with an internal communication channel 416 to allow communication between the communication element 410 and a wireless transmitter 417. The wireless transmitter 417, depending on the size and shape of the device, may be positioned within the body 407, neck 408, or coupler head 409. The wireless transmitter 417 may be replaced by a wired connection. The wired or wireless connection allows data communication with a surface component, such as a surface processor or computer, and the tripping sub 400. An exemplary embodiment for the neck 408 is a spring which provides flexibility and would help to ensure proper placement and coupling pressure between the inner pipe shoulder 203 and the coupler head 409. This ensures an adequate connection between communication element 201 and communication element 410.

The communication element 410 is positioned within the coupler head 409 in such a way that when the tripping sub 400 is properly positioned into the pipe end 200 the communication element 410 of the tripping sub 400 and the communication element 201 of the pipe end 200 are in close proximity or in contact with one another. The communication element 410 may be oversized, compared to the communication element 201, in a direction parallel to the end surface of the coupler head 409. Over sizing the communication element 410 may assist in establishing communicative contact with the communication element 201 if the tripping sub 400 is not fully inserted or properly aligned with the pipe end 200.

Placement of the tripping sub 400 into the pipe end may be accomplished in several ways, such as for example through an automated process or manually. The tripping sub 400 may have sensors for determining and/or measuring forces applied to it and/or its location. The sensors may aid in aligning the tripping sub 400 with the pipe end 200 without damaging the tripping sub 400 or the pipe end 200. In one embodiment, insertion of the tripping sub 400 into the pipe end 200 may automatically cease upon proper verified communication between the communication element 201 of the pipe end 200 and the communication element 410 of the tripping sub 400. For example, an indicator, such as a light (not shown) attached to the tripping sub 400, may signal when proper placement or communication with the pipe end 200 has been achieved.

In one embodiment, the coupler head 409 may be substantially similar in shape to the threaded section 204 of the pipe end 200. For example, the coupler head 409 may be in the shape of a tapered cylinder with one end being of a similar diameter to the diameter of the inner shoulder 203 and having a taper angle matching that of the threaded section 204 of the pipe end 200. The coupler head 409 may extend from the inner shoulder 203 of the pipe end 200 and may terminate before the outer shoulder 205, at the outer shoulder 205, or beyond the outer shoulder 205. The coupler head 409 may have contours similar in shape to the threads of the threaded section 204 to allow for better placement and engagement with the pipe end 200 while not having to thread the tripping sub 400 into the pipe end 200. The shaping of the coupler head 409 as described above may increase the efficiency of placement of the tripping sub 400 into the pipe end 200. By having the coupler head 409 formed in a similar shape to the threaded section 204 axial alignment of the tripping sub 400 into the pipe end 200 may be more readily attained when the surfaces of the coupler head 409 and threaded section 204 are in contact along their entire perimeter. In one embodiment, the tapered surface of the coupler head 409 may force the tripping sub 400 closer toward the center of the pipe end 200 when contacted by the tapered surface of the threaded section 204. The coupler head 409 may be made of a material that is softer than the material of the pipe end 200 in order to ensure that the threads in the threaded section 204 are not damaged during placement of the tripping sub 400. The material of the tripping sub 400 may also be resistive to the corrosive materials and chemicals which it may be in contact with.

FIG. 4B depicts the latching arms 411 in a latched position. In the embodiment shown, the latching arms 411 may rotate about the arm couplers 412 into a position to secure the tripping sub 400 to the pipe end 200 while the tripping sub 400 is positioned within the pipe end 200. In one embodiment, the latching arms 411 may be a bar or sheet of material and have portions 413 that match the contour of an outer diameter 415 of the pipe end 200. In another embodiment, the latching arms 411 may also match a perimeter contour of the pipe end 200 to provide a larger surface for contacting the surface of the outer diameter 415 of the pipe end 200. Coupled between the arm couplers 412, body 407, and latching arms 411 may be a latch mechanism (not shown) which may be used to hold the arms in a generally open (FIG. 4A) or generally closed (FIG. 4B) position. The latching mechanism may be used to resist the axial rotation of latching arms 411 about arm couplers 412 in order to properly secure the tripping sub 400 to the pipe end 200. The latching mechanism may include one of a lock, brake, motor, linear actuator, spring, or any other type of mechanism that may selectively resist rotation, and/or combinations thereof. The latching arms 411 being latched in a closed position (FIG. 4B) allow for the portions 413 of the latching arms 411 to resist the tripping sub 400 from being decoupled from the pipe end 200 by creating a resistive force between portions 413 and the outer diameter 415 of the pipe end 200.

Other forms of quick connection between the tripping sub 400 and pipe end 200 are possible. In one embodiment, the tripping sub 400 may be pressure or friction fit into the pipe end 200. For example, the coupler head 409 may be adjustable from a first diameter to a second diameter, wherein the second diameter is substantially similar to the diameter of the threaded section 204 of the pipe end 200. The coupler head 409 may be constructed of a material that is deformable and has elasticity so that when inserted into the pipe end 200 the coupler head 409 may assume a shape and size similar to that of the threaded section 204. In another embodiment, the coupler head 409 may have a partially threaded exterior in order to provide an additional mode of engagement with the pipe end 200. In another embodiment, the tripping sub 400 may have a connection, such as for example a box end connection, which only requires a partial rotation of the tripping sub 400 to provide coupling engagement with the pipe end 200. In another embodiment, the tripping sub 400 may be held in the pipe end 200 by its own weight.

While the tripping sub 400 is in place, the communication element 201 and communication element 410 are communicatively coupled by proximity or by contact. Well logging instrument 13 may communicate through the wired drill string 20 to the tripping sub 400 while the communication element 201 and communication element 410 are communicatively coupled.

The tripping sub 400 may be attached and detached as described above by a person or through an automated process. The embodiments described above allow for efficient removal and placement of the tripping sub 400 which allows data from well logging instrument 13 to be collected more often and at greater length. The tripping sub 400 may be quickly coupled during downtime in a well drilling process. Normally this would not be feasible as other methods can take several minutes to position and attach a data transmission device.

FIG. 4C shows an embodiment where the coupler head 409 of tripping sub 400 contains an additional locating feature 414 that uses the inner bore 205 to further assist in properly aligning the tripping sub 400 into the pipe end 200. The additional locating feature 414 may be of any size and shape which assists in aligning the tripping sub 400 with the pipe end 200. The shape of the additional locating feature 414 may be, for example, cylindrical, conical, or combinations and sections thereof.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An apparatus for communicating with a wired drill pipe, comprising:
a sub coupler head having a surface that is non-threaded and is configured to provide a retaining force against a threaded section of a wired drill pipe; and
a communication element embedded within the sub coupler head, wherein the communication element is configured to communicatively couple with a pipe communication element within a receiving end of the wired drill pipe if the sub coupler head is positioned within the receiving end of the wired drill pipe.

2. The apparatus of claim 1, wherein the sub coupler head is adjustable from a first diameter to a second diameter, wherein the second diameter is substantially similar to a diameter of the threaded section of the receiving, end of the wired drill pipe.

3. The apparatus of claim 2, wherein the first diameter is larger than the second diameter and the sub coupler head adjusts to match a contour of the threaded section of the wired drill pipe, and wherein the retaining force is provided by the surface of the sub coupler head if adjusted to the second diameter.

4. The apparatus of claim 2, wherein the first diameter is smaller than the second diameter, and wherein the retaining force is provided by the surface of the sub coupler head if adjusted to the second diameter.

5. The apparatus of claim 1, wherein the sub coupler head at the second diameter has a similar contour and shape as a contour and shape of the threaded section of the receiving end of the pipe.

6. The apparatus of claim 1, further comprising a wireless transmitter in communication with the sub coupler head communication element and configured to communicate with a surface component.

7. An apparatus for communicating with a wired drill pipe, comprising:
a body having a sub coupler head coupled thereto;
a communication element embedded within the sub coupler head, wherein the communication element is configured to communicatively couple with a pipe communication element within a receiving end of a wired drill pipe when the sub coupler head is positioned within the receiving end of the wired drill pipe; and
a support coupled to the body and configured to secure the sub coupler head within the receiving end of the wired drill pipe, the support comprising (i) two or more arm whose length generally match a contour of an outer diameter of the receiving end of the pipe and are axially rotatable about an end; and (ii) a latching mechanism coupled between the axially rotatable end of each arm and a perimeter side of the body.

8. The apparatus of claim 7, wherein the latching mechanism provides selective resistance to axial rotation of the arms.

9. The apparatus of claim 7, wherein the arms are coupled at even intervals around the body.

10. The apparatus of claim 7, further comprising a wireless transmitter housed within the body and in communication with the communication element, wherein the wireless transmitter is configured to communicate with a surface component.

11. The apparatus of claim 7, further comprising a neck coupling the body to the sub coupler head, wherein the neck comprises one of a spring, a pipe, or a rod.

12. The apparatus of claim 7, wherein the support comprises:
a plurality of arms coupled to the body, wherein at least one of the plurality of arms is configured to adjust a lateral position of the body and at least one of the plurality of arms is configured to adjust a vertical position of the body.

13. The apparatus of claim 12, wherein the plurality of arms comprises one or more of a cylinder, linear actuator, and drive screw.

14. The apparatus of claim 7, further comprising:
a monitoring system for monitoring at least one of a position of the sub coupler head, a force acting on the sub coupler head, and communication between the sub coupler head communication element and the pipe communication element.

15. A method for placing a communication sub into the receiving end of a wired drill pipe, comprising:
reducing a size of the communication sub from a second diameter to a first diameter inserting the communication sub into a receiving end of a wired drill pipe;
expanding the communication sub from the first diameter to the second diameter; and
communicating data from the wired drill pipe to a surface terminal via the communication sub.

16. The method of claim 15, further comprising adjusting the position of the communication sub until an indication of signal communication between the communication sub and the wired drill pipe is observed.

17. The method of claim 16, wherein adjusting the position of the communication sub comprises:
coupling the communication sub to a motion system; and
adjusting the motion system to adjust the position of the communication sub.

18. The method of claim 16, wherein expanding the communication sub from the first diameter to the second diameter comprises:
expanding the communication sub from the first diameter to the second diameter after the indication of signal communication is observed, thereby creating a retaining force between the communication sub and the receiving end of the wired drill pipe.

19. The method of claim 17, wherein adjusting the position of the communication sub further comprises:
monitoring at least a force acting on the communication sub; and
adjusting the position based on the force.

20. An apparatus for communicating with a wired drill pipe, comprising:
a body having a sub coupler head coupled thereto;
a neck coupling the body to the sub coupler head, wherein the neck comprises one of a spring, a pipe, or a rod;
a communication element embedded within the sub coupler head, wherein the communication element is configured to communicatively couple with a pipe communication element within a receiving end of a wired drill pipe when the sub coupler head is positioned within the receiving end of the wired drill pipe; and
a support coupled to the body and configured to secure the sub coupler head within the receiving end of the wired drill pipe.

* * * * *